US012428099B2

(12) United States Patent
Karashima

(10) Patent No.: US 12,428,099 B2
(45) Date of Patent: Sep. 30, 2025

(54) SADDLED VEHICLE

(71) Applicant: HONDA MOTOR CO., LTD., Tokyo (JP)

(72) Inventor: Akiyuki Karashima, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 549 days.

(21) Appl. No.: 17/945,367

(22) Filed: Sep. 15, 2022

(65) Prior Publication Data

US 2023/0099624 A1 Mar. 30, 2023

(30) Foreign Application Priority Data

Sep. 28, 2021 (JP) ................................. 2021-157965

(51) Int. Cl.
*B62K 25/08* (2006.01)
(52) U.S. Cl.
CPC ................... *B62K 25/08* (2013.01)
(58) Field of Classification Search
CPC .................................................... B62K 25/08
See application file for complete search history.

(56) References Cited

U.S. PATENT DOCUMENTS

| 4,609,202 A | 9/1986 | Miyakoshi et al. | |
| 4,735,276 A * | 4/1988 | Burton | B62K 25/08 |
| | | | 180/219 |
| 4,971,344 A * | 11/1990 | Turner | B62K 25/08 |
| | | | 188/280 |
| 7,243,765 B2 | 7/2007 | Marcacci | |
| 8,499,906 B2 * | 8/2013 | Shirai | B62K 25/08 |
| | | | 188/299.1 |
| 2002/0074769 A1 * | 6/2002 | Barefoot | B62K 25/08 |
| | | | 280/276 |
| 2005/0167217 A1 | 8/2005 | Marcacci | |
| 2008/0282830 A1 | 11/2008 | Hara | |
| 2021/0107588 A1 | 4/2021 | Sakagawa et al. | |

FOREIGN PATENT DOCUMENTS

| DE | 202010012604 U1 * | 12/2010 | ............ B62K 25/08 |
| JP | 59-223583 A | 12/1984 | |
| JP | 1-113094 U | 7/1989 | |
| JP | 2004-345366 A | 12/2004 | |
| JP | 2005-247303 A | 9/2005 | |
| JP | 2021-62774 A | 4/2021 | |

OTHER PUBLICATIONS

Japanese Notice of Reasons for Refusal for Japanese Application No. 2021-157965, dated Jun. 21, 2023, with an English translation.

* cited by examiner

*Primary Examiner* — Drew J Brown
(74) *Attorney, Agent, or Firm* — Birch, Stewart, Kolasch & Birch, LLP

(57) ABSTRACT

A saddled vehicle including front forks and a steering handlebar that steers the front forks includes a stroke adjuster that adjusts the stroke amount of the front forks, a lever is attached to the steering handlebar, and the stroke adjuster is connected to the lever via a cable. The stroke adjuster includes a release mechanism that returns the stroke amount that has been adjusted by operating the lever to its initial state by operating the lever again.

2 Claims, 4 Drawing Sheets

SADDLED VEHICLE

TECHNICAL FIELD

The present invention relates to a saddled vehicle, and more particularly to a saddled vehicle including front forks as a cushion unit supporting a front wheel.

BACKGROUND ART

Conventionally, in a saddled vehicle including front forks as a cushion unit supporting a front wheel, configurations that allow adjustment of the operating characteristics of the front forks have been known.

Patent Literature 1 discloses a saddled vehicle in which the damping force of the front forks can be adjusted by operating a lever on a steering handlebar.

CITATION LIST

Patent Literature

Patent Literature 1: JP H1-113094 U

SUMMARY OF INVENTION

Problem to be Solved by Invention

However, the configuration of Patent Literature 1 adjusts the damping force of the front forks by lever operation, and it has not been considered to adjust the stroke amount of the front forks by lever operation.

An object of the present invention is to solve the above problem in the prior art and provide a saddled vehicle in which the stroke amount of the front forks can be adjusted by a lever attached to a steering handlebar.

Solution to Problem

In order to achieve the above object, the present invention has a first feature in that a saddled vehicle (1) including front forks (15) that support a front wheel (WF), and a steering handlebar (6) that steers the front forks (15), includes a stroke adjuster (70) that adjusts the stroke amount of the front forks (15), a lever (60) is attached to the steering handlebar (6), and the stroke adjuster (70) is connected to the lever (60) via a cable (61).

In addition, the present invention has a second feature in that the stroke adjuster (70) includes a release mechanism that returns the stroke amount that has been adjusted by operating the lever (60) to its initial state by operating the lever (60) again.

Further, the present invention has a third feature in that the stroke adjuster (70) includes an engagement member (71) that is actuated in response to the operation of the lever (60), an engaged member (80) is attached to the front forks (15), the stroke amount of the front forks (15) is adjusted by engaging the engagement member (71) with the engaged member (80), and the engagement member (71) is biased by a spring member (75) in the direction of returning to its initial position, and by activating the release mechanism, the engagement member (71) is released from the engaged member (80) by the biasing force of the spring member (75).

Advantageous Effects of Invention

According to a first feature, a saddled vehicle (1) including front forks (15) supporting a front wheel (WF), and a steering handlebar (6) that steers the front forks (15), the saddled vehicle (1) includes a stroke adjuster (70) that adjusts the stroke amount of the front forks (15), a lever (60) is attached to the steering handlebar (6), and the stroke adjuster (70) is connected to the lever (60) via a cable (61). Thus, it is possible to adjust the stroke amount of the front forks by operating the lever attached to the steering handlebar.

According to the second feature, the stroke adjuster (70) includes a release mechanism that returns the stroke amount that has been adjusted by operating the lever (60) to its initial state by operating the lever (60) again. Thus, it is possible to return the stroke amount that has been once adjusted by operating the lever to its initial state by operating the lever again.

According to the third feature, the stroke adjuster (70) includes an engagement member (71) that is actuated in response to the operation of the lever (60), an engaged member (80) is attached to the front forks (15), the stroke amount of the front forks (15) is adjusted by engaging the engagement member (71) with the engaged member (80), and the engagement member (71) is biased by a spring member (75) in the direction of returning to its initial position, and by activating the release mechanism, the engagement member (71) is released from the engaged member (80) by the biasing force of the spring member (75). This allows the stroke amount to be easily adjusted by operating the lever. The stroke amount can also be easily returned to its initial state by operating the lever again.

DESCRIPTION OF EMBODIMENTS

Figure 1:
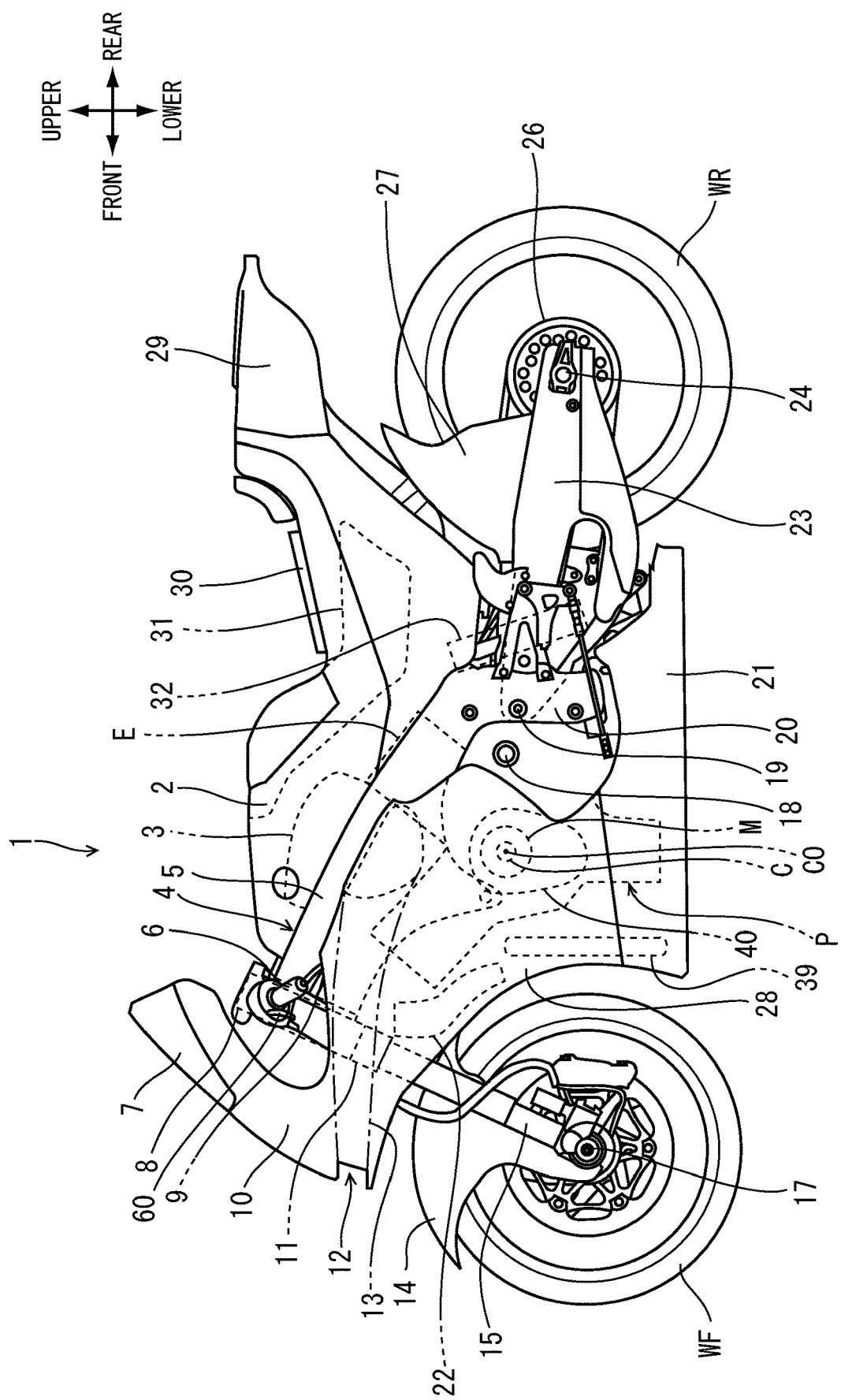
FIG. 1 is a right side view of a motorcycle according to an embodiment of the present invention.

Hereinafter, preferred embodiments of the present invention are explained in detail with reference to the drawings. FIG. 1 is a left side view of a motorcycle 1 according to one embodiment of the present invention. A vehicle body frame 4 of the motorcycle 1 as a saddled vehicle has a pair of left and right main frames 5 extending rearwardly and downwardly from a head pipe 9. The steering system for the front wheel WF, which is supported by the head pipe 9 to be swingable, includes a pair of left and right front forks 15 that pivotally support the front wheel WF by an axle 17, a top bridge 8 and a bottom bridge 11 that clamp the front forks 15 above and below the head pipe 9, and a steering stem (see FIG. 3) that connects the top bridge 8 and the bottom bridge 11 to each other and is supported by the head pipe 9.

A steering handlebar 6 is fixed to the front forks 15 at a position directly below the top bridge 8. An adjustment lever 60 for adjusting the stroke amount of the front forks 15 is attached to the steering handlebar 6 on the left side of the vehicle in the width direction.

A pair of left and right pivot frames 20, which support a pivot 19 that is pivotally supports a swing arm 23 to be swingable, are connected to the rear end of the main frame 5. A power unit P, which integrates a V-type 4-cylinder engine E and a transmission, is fixed below the main frame 5 and in front of the pivot frame 20. The combustion gas from the engine E is guided through an exhaust pipe to a muffler at the rear of the vehicle body. A rear wheel WR is pivotally supported by an axle 24 at the rear end of the swing arm 23 to be rotatable. The drive power of the engine E is transmitted to the rear wheels WR via an unterminated drive chain 26 that is wound around a drive sprocket 18 fixed to an output shaft.

A front cowl 10 including a windshield screen 7 is disposed in front of the head pipe 9. A pair of left and right side cowls 28 covering the sides of the vehicle body are connected at the rear of the front cowl 10 covering the front of the vehicle body, and under cowls 21 covering the lower portion of the power unit P are connected at the lower end portion of the side cowls 28.

A front fender 14 covering the upper portion of the front wheel WF is fixed to the front forks 15. A fuel tank 31 and a tank cover 2 covering the upper portion of an air cleaner box 3 are attached to the upper portion of the main frame 5. A rear cowl 29 is disposed behind a seat 30 that is attached to the tank cover 2, and a rear fender 27 covering the upper portion of the rear wheel WR is fixed to the upper portion of swing arm 23.

The swing arm 23 is suspended from the vehicle body frame 4 by a rear cushion 32 that is disposed behind the pivot 19. A pair of left and right air conduit pipes 13 that lead outside air to the air cleaner box 3 are disposed on the outside of the main frame 5 in the vehicle width direction. The air conduit pipes 13 pass through the outside of the front forks 15 in the vehicle width direction and meet in front of the head pipe 9, and are connected to an intake opening 12 provided at the center of the front cowl 10 in the vehicle width direction. A radiator 22 elongated in the vehicle width direction is disposed in front of the vehicle body of the engine E, and an oil cooler 39 elongated in the longitudinal direction is disposed below the radiator 22.

A generator M as an electric motor driven by the rotational power of a crankshaft C is provided on the left side of the engine E in the vehicle width direction. The center of rotation axis CO of the generator M coincides with the center of rotation axis of the crankshaft C that is oriented in the vehicle width direction. The outside of the generator M in the vehicle width direction is covered by a cover member 40 that is attached to a crankcase.

Figure 2:
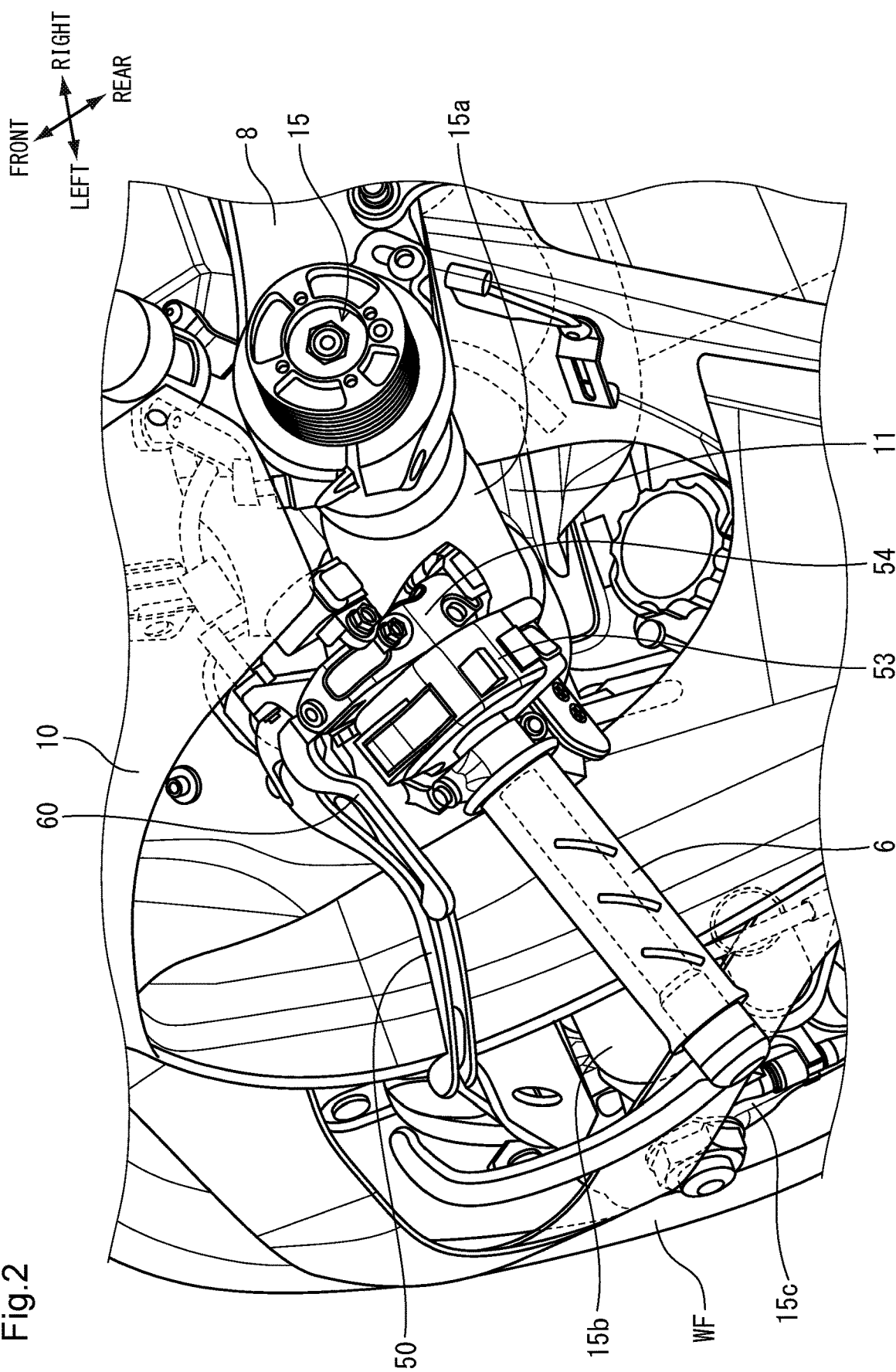
FIG. 2 is a perspective view illustrating a structure around a left steering handlebar.

FIG. 2 is a perspective view illustrating a structure around the left steering handlebar 6. The front fork 15 is an inverted cushion unit with an inner tube 15b disposed below an outer tube 15a. A bottom member 15c supporting a front wheel brake caliper is fixed to the lower end portion of the inner tube 15b. The upper end portion of the outer tube 15a is fixed by a top bridge 8. The steering handlebar 6 is attached to the outer tube 15a at a position directly below the top bridge 8.

A handlebar switch 53 and a lever holder 54 are attached to the left steering handlebar 6. A clutch lever 50 is pivotally supported by the lever holder 54 at the front end portion to be swingable. A small lever 60 for adjusting the stroke amount of the front forks 15 is pivotally supported at the upper rear portion of the clutch lever 50 to be swingable.

Figure 3:
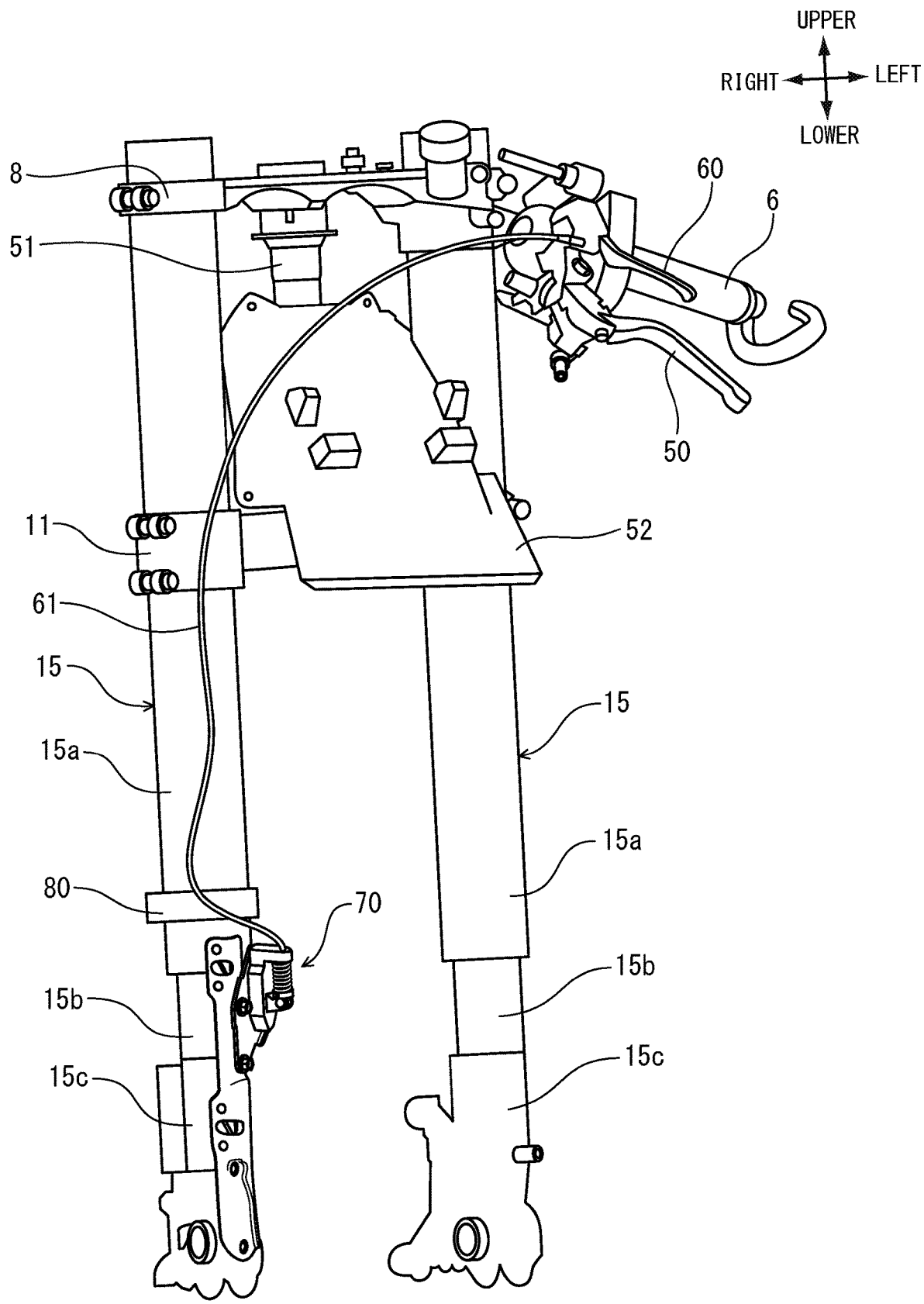
FIG. 3 is a perspective view of front forks.

FIG. 3 is a perspective view of the front forks 15. A wind duct 52 is disposed in front of a steering stem 51 that is pivotally supported by the head pipe 9 to be swingable. A top bridge 8 is fixed to the upper end portion of the steering stem 51, and a bottom bridge 11 is fixed to the lower end portion of the steering stem 51. Outer tubes 15a of the front forks 15 are supported by the top bridge 8 and the bottom bridge 11.

A stroke adjuster 70 according to the present embodiment is supported on a bottom member 15c of the front fork 15 on the right side in the vehicle width direction. The stroke adjuster 70 has a function of securing the front forks 15 in a state of being contracted to a predetermined position. In other words, the stroke adjuster 70 has a function of adjusting the stroke amount of the front forks 15.

The stroke adjuster 70 is connected to the lever 60 via a cable 61. This allows the stroke adjuster 70 to be actuated by operating the lever 60. An engaged member 80 is attached above the stroke adjuster 70, near the lower end portion of the outer tube 15a.

When securing the front forks 15 in the contacted state, the lever 60 is pulled with the front forks 15 in the pushed down and contracted state to the position where the stroke adjuster 70 and the engaged member 80 overlap, or after the lever 60 is pulled, the front forks 15 are pushed down and contracted to the position where the stroke adjuster 70 and the engaged member 80 overlap. This locks the stroke adjuster 70 and the engaged member 80, and the front forks 15 are held in the contracted state.

This stroke amount adjustment is made to maintain a low body posture when starting the motorcycle 1. The locked state of the stroke adjuster 70 and the engaged member 80 is configured to be released by strong braking, but this embodiment further has a release mechanism whereby the locked state is released (returned to its initial state) by operating the lever 60 again while the front forks 15 are locked.

Figure 4:
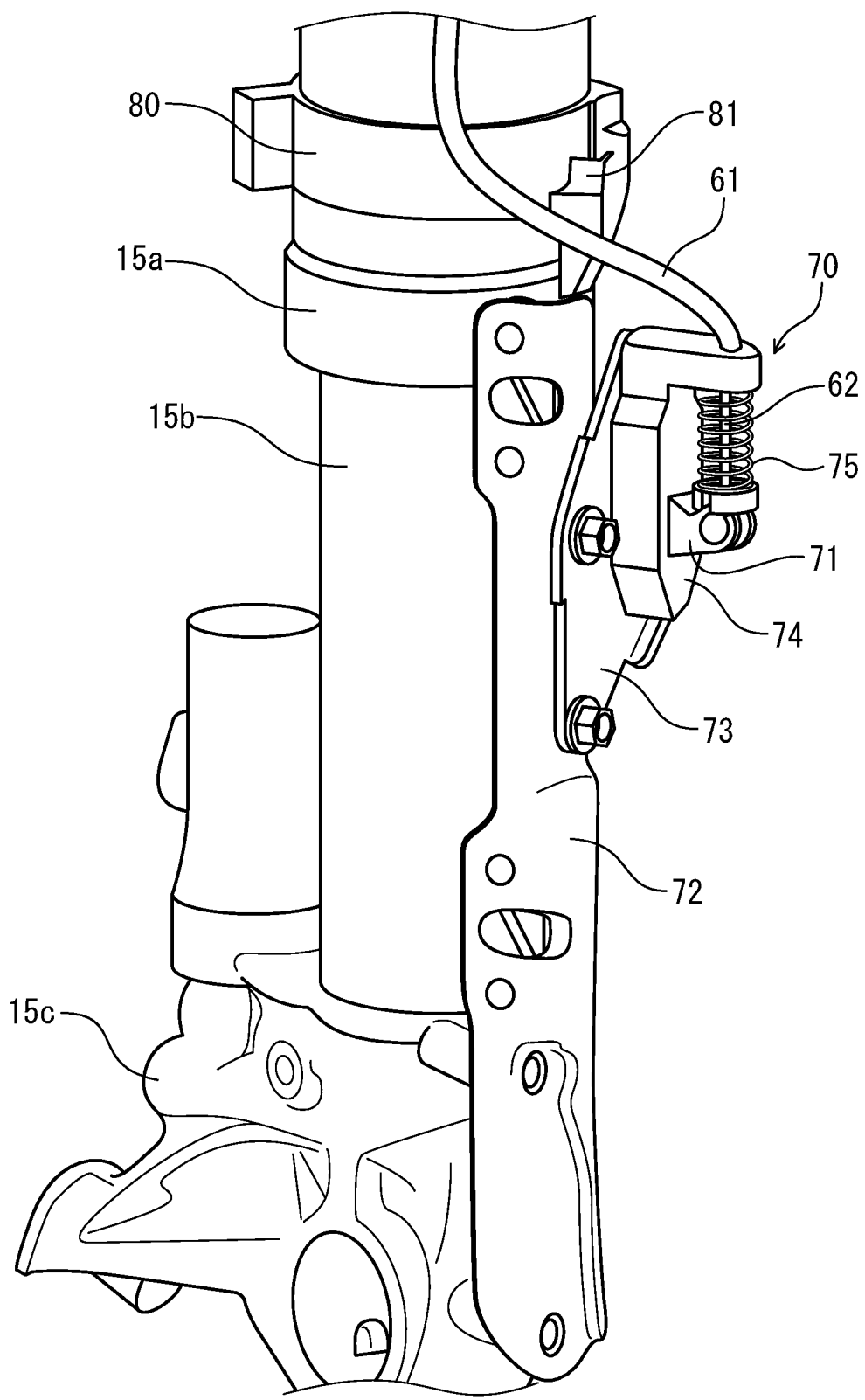
FIG. 4 is a perspective view illustrating a stroke adjuster and its surrounding structure.

FIG. 4 is a perspective view illustrating the stroke adjuster 70 and its surrounding structure. A long vertical support plate 72 is fixed to a bottom member 15c of the front fork 15. The stroke adjuster 70 is supported by a stay 73 that is fixed to a support plate 72.

A main body portion 74 of the stroke adjuster 70 has an engagement member 71 that is vertically slidable. A protrusion that protrudes as the engagement member 71 slides upward is provided on the back side of the engagement member 71. This protrusion engages a recess 81 in the engaged member 80, thereby the front forks 15 are locked in the contracted state.

A wire 62 of the cable 61 is connected to the engagement member 71, and the engagement member 71 slides upward when the lever 60 is pulled. The engagement member 71 is given a biasing force in the direction of returning to its initial position by a spring member 75. When the lever 60 is operated again while the front forks 15 is locked, the engagement member 71 is released from the engaged member 80 by the biasing force of the spring member 75, and the front forks 15 are unlocked.

As described above, the front fork structure according to the present invention includes the stroke adjuster 70 that adjusts the stroke amount of the front forks 15, in which the lever 60 is attached to the steering handlebar 6, and the stroke adjuster 70 is connected to the lever 60 via the cable 61. Thus, it possible to adjust the stroke amount of the front forks 15 by operating the lever 60 attached to the steering handlebar 6. In addition, the stroke adjuster 70 includes a release mechanism that returns the stroke amount that has been adjusted by operating the lever 60 to its initial state by operating the lever 60 again. Thus, it is possible to return the stroke amount that has been once adjusted by operating the lever 60 to its initial state by operating the lever 60 again. In addition, the stroke adjuster 70 includes the engagement member 71 that is actuated in response to the operation of the lever 60, the engaged member 80 is attached to the front forks 15, the stroke amount of the front forks 15 is adjusted by engaging the engagement member 71 with the engaged member 80, and the engagement member 71 is biased by a spring member 75 in the direction of returning to its initial position, and by activating the release mechanism, the engagement member 71 is released from the engaged member 80 by the biasing force of the spring member 75. This allows the stroke amount to be easily adjusted by operating the lever 60 and easily returned to its initial state by operating the lever 60 again.

Note that the form of the motorcycle, the structure of the front forks, the shape and structure of the lever for adjusting the stroke amount, the arrangement of the lever, the structure and arrangement of the stroke adjuster, and the cable arrangement method are not limited to the above embodiment, and various modifications may be made. The front fork structure according to the present invention can be applied not only to motorcycles but also to saddled tricycles and the like.

REFERENCE SIGNS LIST

1 Motorcycle (saddled vehicle)
6 Steering handlebar
15 Front fork
60 Lever
61 Cable
70 Stroke adjuster
71 Engagement member
75 Spring member
80 Engaged member
WF Front wheel

What is claimed is:

1. A saddled vehicle comprising:
   front forks that support a front wheel, the front forks being inverted front forks having an outer tube and an inner tube disposed below the outer tube;
   a steering handlebar that steers the front forks;
   a lever attached to the steering handlebar; and
   a stroke adjuster connected to the lever via a cable,
   wherein the stroke adjuster comprising a support plate on a bottom member of the inner tube,
   wherein the stroke adjuster is supported by the support plate,
   wherein an engaged member that engages with an engagement member is provided above the stroke adjuster and in the vicinity of a lower end portion of the outer tube,
   wherein the engagement member is biased to an initial position by a spring member,
   wherein by operating the lever when the front forks are compressed to a position where the engagement member and the engaged member overlap, the engagement member moves to an engagement position and engages with the engaged member to fix the front forks in a compressed state, and
   wherein a locked state between the engagement member and the engaged member is released by braking.

2. The saddled vehicle according to claim 1, wherein the engagement member is provided with a protrusion that protrudes to a rear surface side via the cable when the lever is pulled, and
   wherein the front forks are fixed in a compressed state by the protrusion engaging with the engaged member in a state where the front forks are compressed.

* * * * *